US011258553B2

United States Patent
Shi

(10) Patent No.: US 11,258,553 B2
(45) Date of Patent: Feb. 22, 2022

(54) CARRIER LOAD CONTROL METHOD, NETWORK DEVICE AND UE

(71) Applicant: GUANGDONG OPPO MOBILE TELECOMMUNICATIONS CORP., LTD., Guangdong (CN)

(72) Inventor: Cong Shi, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 0 days.

(21) Appl. No.: 16/903,071

(22) Filed: Jun. 16, 2020

(65) Prior Publication Data

US 2020/0313813 A1 Oct. 1, 2020

Related U.S. Application Data

(63) Continuation of application No. PCT/CN2017/117836, filed on Dec. 21, 2017.

(51) Int. Cl.
*H04L 1/00* (2006.01)
*H04W 48/10* (2009.01)
(Continued)

(52) U.S. Cl.
CPC ............ *H04L 5/001* (2013.01); *H04L 5/0042* (2013.01); *H04W 48/10* (2013.01);
(Continued)

(58) Field of Classification Search
CPC ...... H04L 5/001; H04L 5/0042; H04W 48/10; H04W 68/005; H04W 74/004; H04W 74/006; H04W 74/0833
See application file for complete search history.

(56) References Cited

U.S. PATENT DOCUMENTS

| | | | |
|---|---|---|---|
| 2009/0268831 A1 | 10/2009 | Onggosanusi | |
| 2012/0014330 A1 | 1/2012 | Damnjanovic | |
| 2015/0282215 A1* | 10/2015 | Eriksson | H04W 74/0833 370/329 |

(Continued)

FOREIGN PATENT DOCUMENTS

| | | |
|---|---|---|
| CN | 101473619 A | 7/2009 |
| CN | 102668673 A | 9/2012 |

(Continued)

OTHER PUBLICATIONS

ZTE Corporation, Sane Chips, Initial discussion on the impacts of BWP on RAN2, Discussion and Decision, 3GPP TSG-RAN WG2 Meeting #99bis R2-1711640, Oct. 9-13, 2017.

(Continued)

*Primary Examiner* — Jianye Wu
(74) *Attorney, Agent, or Firm* — Perkins Coie LLP

(57) ABSTRACT

A method for controlling carrier load, a network device and a user equipment (UE) are provided. The method comprises: configuring an uplink bandwidth part set and a downlink bandwidth part set for a UE according to broadcast information, wherein the uplink bandwidth part set comprises at least two uplink bandwidth parts, and the at least two uplink bandwidth parts are a part of all uplink bandwidth parts that the network device can allocate; at least two uplink bandwidth parts comprises at least one first uplink bandwidth part comprising physical random access channel (PRACH) resource configuration information; the downlink bandwidth part set comprises at least two downlink bandwidth parts, and the at least two downlink bandwidth parts are a part of all downlink bandwidth parts that the network device can allocate.

3 Claims, 5 Drawing Sheets

(51) Int. Cl.
  *H04W 68/00* (2009.01)
  *H04W 74/00* (2009.01)
  *H04W 74/08* (2009.01)
  *H04L 5/00* (2006.01)

(52) U.S. Cl.
  CPC ....... *H04W 68/005* (2013.01); *H04W 74/004* (2013.01); *H04W 74/006* (2013.01); *H04W 74/0833* (2013.01)

(56) References Cited

U.S. PATENT DOCUMENTS

| | | |
|---|---|---|
| 2016/0065345 A1 | 3/2016 | Kim et al. |
| 2017/0135105 A1 | 5/2017 | Li et al. |
| 2018/0316481 A1* | 11/2018 | Montojo ............. H04W 74/004 |

FOREIGN PATENT DOCUMENTS

| | | |
|---|---|---|
| CN | 105099634 A | 11/2015 |
| CN | 105122676 A | 12/2015 |

OTHER PUBLICATIONS

Huawei et al: "Control plane impacts for Bandwidth Parts", 3GPP Draft; R2-1710457, 3rd Generation Partnership Project (3GPP), Mobile Competence Centre; 650, Route Des Lucioles; F-06921 Sophia-Antipolis Cedex; France RAN WG2, Prague, Czech Republic; Oct. 9, 2017-Oct. 13, 2017 Oct. 8, 2017 (Oct. 8, 2017), XP051342502, Retrieved from the Internet: URL: http://www.3gpp.org/ftp/Meetings-_3GPP SYNC/RAN2/Docs/ [ retrieved on Oct. 8, 2017].

Huawei et al: "Offline discussion for BWP", 3GPP Draft; R2-1714182 Offline Discussion on BWP, 3rd Generation Partnership Project (3GPP), Mobile Competence Centre ; 650, Route Des Lucioles ; F-06921 Sophia-Antipolis Cedex ; France, RAN WG2, Reno, USA; Nov. 27, 2017-Dec. 1, 2017 Dec. 4, 2017 (Dec. 4, 2017), XP051372814, Retrieved from the Internet: URL: http://www.3gpp.org/ftp/tsg%5Fran/WG2%5FRL2/TSGR2%5F100/Docs/ [retrieved on Dec. 4, 2017].

Supplementary European Search Report in the European application No. 17935287.7, dated Nov. 11, 2020.

Written Opinion of the International Search Authority in the international application No. PCT/CN2017/117836, dated Aug. 30, 2018.

International Search Report in the international application No. PCT/CN2017/117836, dated Aug. 30, 2018.

* cited by examiner

CARRIER LOAD CONTROL METHOD, NETWORK DEVICE AND UE

CROSS-REFERENCE TO RELATED APPLICATIONS

This is a continuation application of International Patent Application No. PCT/CN2017/117836, filed on Dec. 21, 2017, the disclosure of which is hereby incorporated by reference in its entirety.

BACKGROUND

At present, with pursuit of people for the rate, the delay, high-speed mobility and efficiency and diversification and complication of services in the future life, the international standard organization about 3rd Generation Partnership Project (3GPP) has started researching and developing 5th-Generation (5G). In discussions about New Radio (NR), a maximum channel bandwidth of each NR carrier is 100 MHz at a low frequency and 400 MHz at a high frequency, and the 100 MHz/400 MHz channel bandwidth is continuous. If a UE keeps operating on a broadband carrier, power consumption of the UE is very high. Therefore, it is suggested that a Radio Frequency (RF) bandwidth of the UE may be regulated according to a practical throughput of the UE. For example, a small bandwidth (for example, Bandwidth Part (BWP) 1 in FIG. 1) may be configured for a UE if a rate of the UE is very low, and a great bandwidth (for example, BWP2 in FIG. 2, a bandwidth of the BWP2 is greater than a bandwidth of the BWP1 in FIG. 1) may be configured for the UE if the rate of the UE is required to be high. If the UE supports a high rate or operates in a Carrier Aggregation (CA) mode, the UE may be configured with multiple BWPs (BWP1 and BWP2 in FIG. 3).

Therefore, the concept of BWP is introduced. For Evolved Universal Terrestrial Radio Access (E-UTRA) NR-Dual Connectivity (EN-DC), a network side configures at most four Downlink (DL) BWPs and at most four Uplink (UL) BWPs. If a Random Access Channel (RACH) resource is configured in an activated BWP, MSG1 is transmitted in the activated UL BWP, otherwise MSG1 is transmitted in a default UL BWP. However, for MSG2, the network side may send a downlink Random Access Response (RAR) in all possible BWPs, which may cause system resource waste and increase a conflict probability.

SUMMARY

The disclosure relates to the technical field of information processing, and particularly to a method for controlling carrier load, a network device, a user equipment (UE) and a computer storage medium.

A first aspect of the embodiments of the disclosure provides a method for controlling a carrier load, which may be applied to a UE and include the following operation.

An uplink bandwidth part set and a downlink bandwidth part set configured by a network side are received through broadcast information.

The uplink bandwidth part set may include at least two uplink bandwidth parts, the at least two uplink bandwidth parts may be a part of all uplink bandwidth parts that can be allocated by the network device, and the at least two uplink bandwidth parts may include at least one first uplink bandwidth part including physical random access channel (PRACH) resource configuration information.

The downlink bandwidth part set may include at least two downlink bandwidth parts, and the at least two downlink bandwidth parts may be a part of all downlink bandwidth parts that can be allocated by the network device.

A second aspect of the embodiments of the disclosure provides a network device, which may include a processor, a network interface, and a memory configured to store a computer program capable of running in the processor.

The processor is configured to run the computer program to execute an operation of: configuring an uplink bandwidth part set and a downlink bandwidth part set for a UE through broadcast information.

The uplink bandwidth part set may include at least two uplink bandwidth parts, the at least two uplink bandwidth parts may be a part of all uplink bandwidth parts that can be allocated by the network device, and the at least two uplink bandwidth parts may include at least one first uplink bandwidth part including physical random access channel (PRACH) resource configuration information.

The downlink bandwidth part set may include at least two downlink bandwidth parts, and the at least two downlink bandwidth parts may be a part of all downlink bandwidth parts that can be allocated by the network device.

A third aspect of the embodiments of the disclosure provides a UE, which may include a processor, a network interface and a memory configured to store a computer program capable of running in the processor.

The network interface is configured to receive an uplink bandwidth part set and a downlink bandwidth part set configured by a network side through broadcast information.

The uplink bandwidth part set may include at least two uplink bandwidth parts, the at least two uplink bandwidth parts may be a part of all uplink bandwidth parts that can be allocated by the network device, and the at least two uplink bandwidth parts may include at least one first uplink bandwidth part including physical random access channel (PRACH) resource configuration information.

The downlink bandwidth part set may include at least two downlink bandwidth parts, and the at least two downlink bandwidth parts may be a part of all downlink bandwidth parts that can be allocated by the network device.

DETAILED DESCRIPTION

For making the characteristics and technical contents of the embodiments of the disclosure be understood in more detail, implementation of the embodiments of the disclosure will be described below in combination with the drawings in detail. The drawings are only used for description as references and not intended to limit the embodiments of the disclosure.

First Embodiment

The embodiment of the disclosure provides a method for controlling carrier load, which is applied to a network device and includes the following operation.

An uplink bandwidth part set and a downlink bandwidth part set are configured for a UE through broadcast information.

The uplink bandwidth part set includes at least two uplink bandwidth parts, the at least two uplink bandwidth parts are a part of all uplink bandwidth parts that can be allocated by the network device, and the at least two uplink bandwidth parts include at least one first uplink bandwidth part including physical random access channel (PRACH) resource configuration information.

The downlink bandwidth part set includes at least two downlink bandwidth parts, and the at least two downlink bandwidth parts are a part of all downlink bandwidth parts that can be allocated by the network device.

It is to be understood that the above operation that the uplink bandwidth part set and the downlink bandwidth part set are configured for the UE refers to that the network device configures the uplink bandwidth part set and the downlink bandwidth part set for all or at least a part of UEs managed by the network device, and the number of the UEs configured with the uplink bandwidth part set and the downlink bandwidth part set is not limited.

That is, a network side (the network device) broadcasts a group of common DL BWP set and UL BWP set in a system broadcast message, and each of the DL BWPs and the UL BWPs corresponds to a configured index value.

Moreover, the at least two UL BWPs included in the UL BWP set includes at least one first uplink bandwidth part including physical Random Access Channel (PRACH) resource configuration information.

It is to be pointed out that, in the embodiment, the number of uplink bandwidth parts in the configured uplink bandwidth part set may be larger than 1 and smaller than the number of all uplink bandwidth parts divided by a present system. For example, if the present system may divide into four uplink bandwidth parts, the uplink bandwidth part set includes two or three common uplink bandwidth parts. In addition, the downlink bandwidth part set is the same as the above description for the uplink bandwidth part set and will not be elaborated herein.

Figure 1:
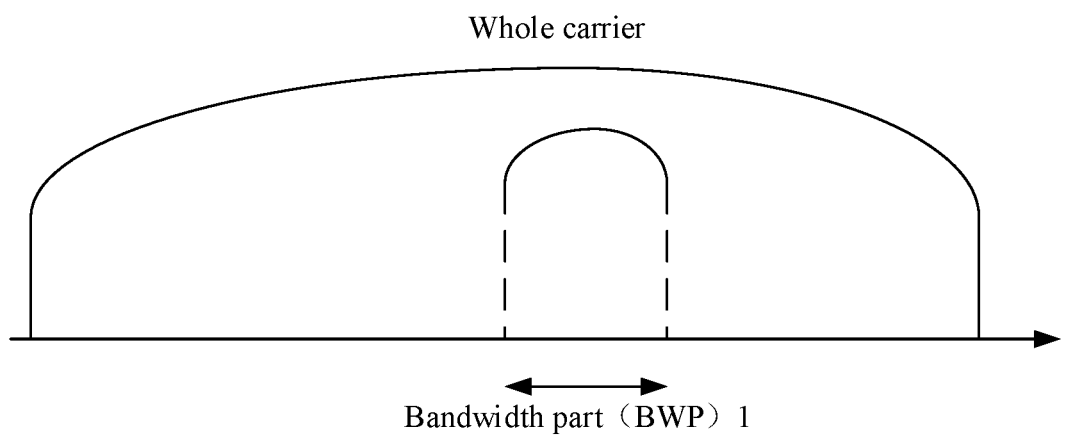
FIG. 1 is a first division diagram of a BWP.
Figure 2:
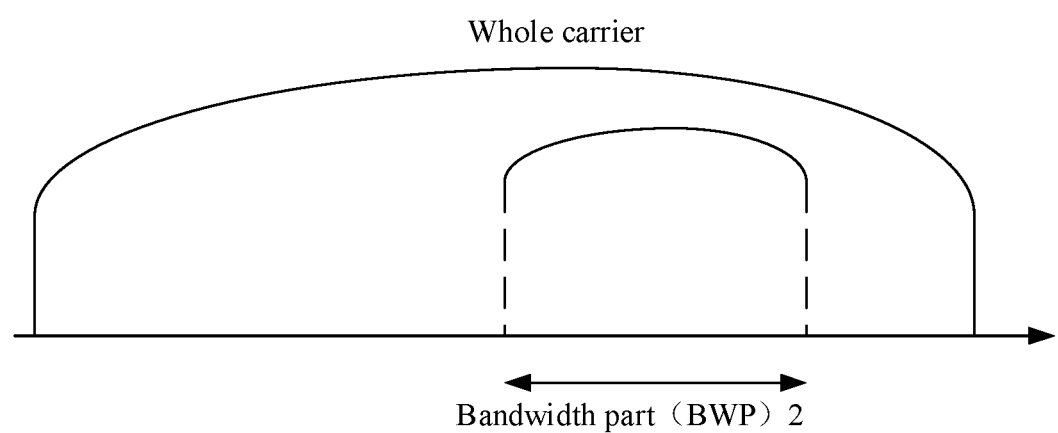
FIG. 2 is a second division diagram of a BWP.
Figure 3:
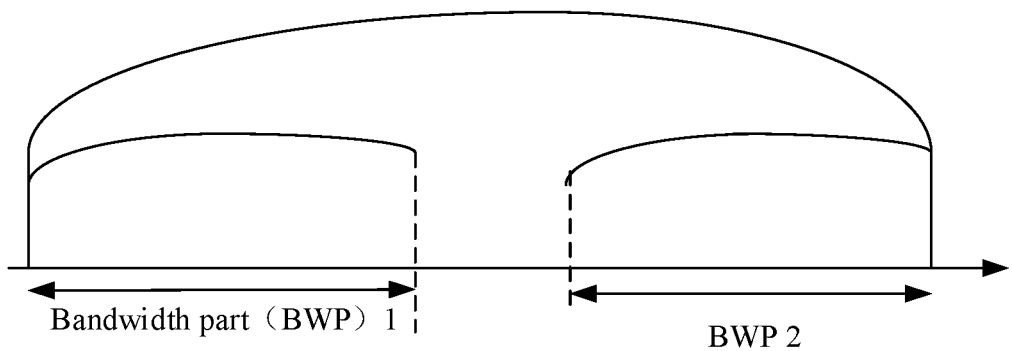
FIG. 3 is a third division diagram of a BWP.
Figure 4:
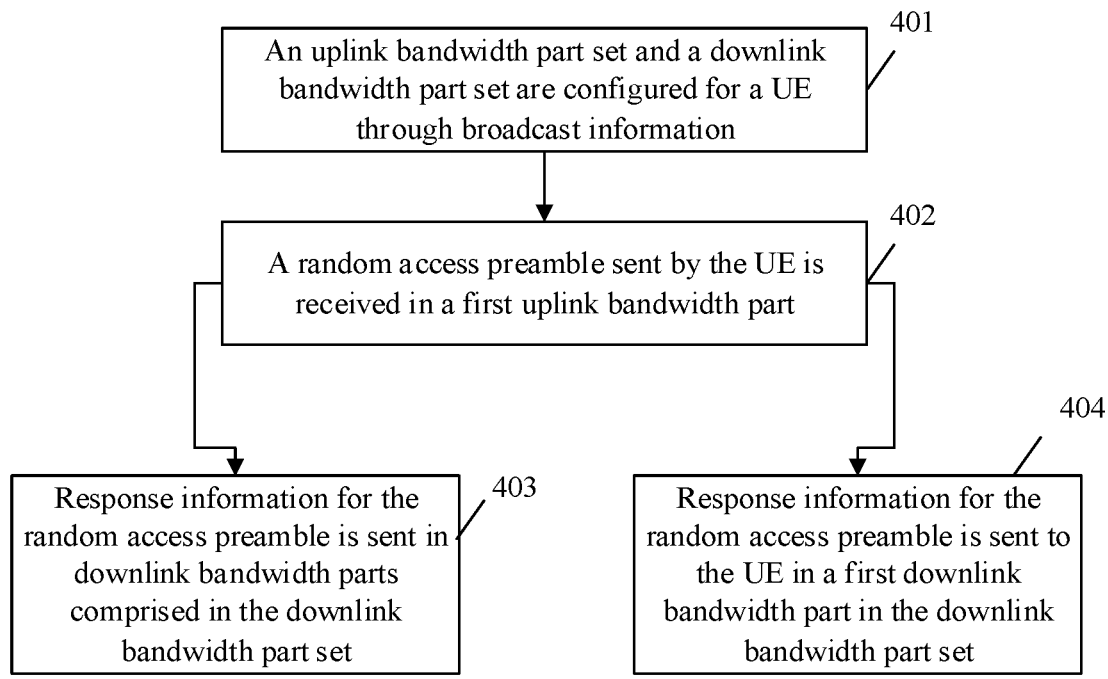
FIG. 4 is a first flowchart of a method for controlling carrier load.
Figure 5:
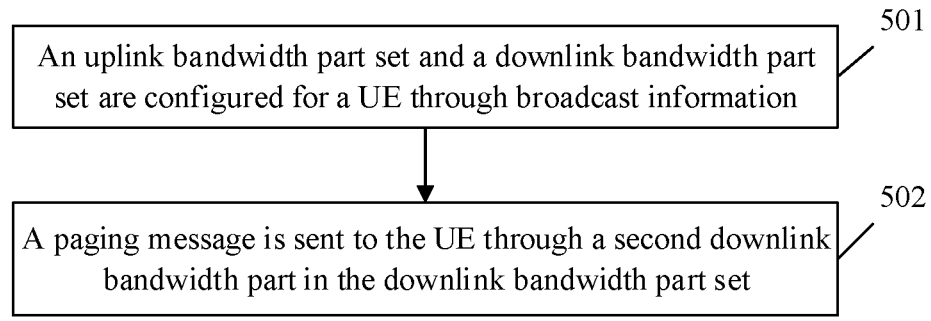
FIG. 5 is a second flowchart of a method for controlling carrier load.

Furthermore, the embodiment will be elaborated from two processing scenarios in combination with FIG. 4 and FIG. 5 respectively.

In a first scenario, as shown in FIG. 4, operations 401 to 404 are included.

In operation 401, an uplink bandwidth part set and a downlink bandwidth part set are configured for a UE through broadcast information.

In operation 402, a random access preamble sent by the UE is received in a first uplink bandwidth part.

In operation 403, response information for the random access preamble is sent in a downlink bandwidth part included in the downlink bandwidth part set.

Alternatively, there may be another processing manner.

That is, after operations 401 and 402 are completed, operation 404 is executed, in which, the response information for the random access preamble is sent to the UE in a first downlink bandwidth part in the downlink bandwidth part set.

That is, for a random access process, the UE sends MSG1 in a UL BWP including a PRACH resource in common uplink bandwidth parts.

In a first manner, a network side sends an RAR in all BWPs in the common DL BWP set, and the UE is only required to monitor the RAR in one DL BWP in the common DL BWP set.

In a second manner, the network side sends the RAR in one BWP in the common DL BWP set, and the UE monitors the RAR in the DL BWP.

In the second manner, an operation that a DL BWP where MSG2 is monitored is determined may include an operation that an index value of the first downlink bandwidth part is calculated based on an index of the random access preamble and the number of downlink bandwidth parts included in the downlink bandwidth part set.

The calculation method may include executing a modulo operation by use of the index of the random access preamble and the number of the downlink bandwidth parts included in the downlink bandwidth part set to obtain an operation result as the index value of the DL BWP.

For example, the index of the DL BWP=an index of sending the preamble mod (the number of the BWPs in the DL BWP set).

Second Scenario

As shown in FIG. 5, operations 501 and 502 are included.

In operation 501, an uplink bandwidth part set and a downlink bandwidth part set are configured for a UE through broadcast information.

In operation 502, a paging message is sent to the UE through a second downlink bandwidth part in the downlink bandwidth part set.

A manner for calculating an index value of the second downlink bandwidth part in operation 502 may include the following operation.

The index value corresponding to the second downlink bandwidth part for sending the paging message to the UE is calculated based on identification information of the UE and the number of downlink bandwidth parts included in the downlink bandwidth part set.

Specifically, a modulo operation is executed by use of an Identifier (ID) of the UE and the number of the downlink bandwidth parts included in the downlink bandwidth part set, to obtain a calculation result as the index value corresponding to the second downlink bandwidth part for sending the paging message to the UE.

For example, for reception of the paging message by the UE, the UE monitors the paging message in a BWP in the common DL BWP set, and the DL BWP is determined by a UE-ID calculated by a paging opportunity mod the number of the BWPs in the DL BWP set. That is, an index of the DL BWP for monitoring the paging message=UE-ID mod (the number of the BWPs in the DL BWP set).

It can be seen that, with the abovementioned manner, the network side configures a part of uplink bandwidth parts and downlink bandwidth parts for the UE, and the part of uplink bandwidth parts and downlink bandwidth parts, as common resources, are configured to perform processing such as paging and random access. Therefore, the problem of relatively high conflict probability caused by performing the processing of paging and random access in only one uplink bandwidth part and only one downlink bandwidth part can be solved, and the problem of network-side resource waste caused by sending of a DL random access response in all BWPs can also be solved.

Second Embodiment

The embodiment of the disclosure provides a method for controlling carrier load, which is applied to UE and includes the following operation.

An uplink bandwidth part set and a downlink bandwidth part set configured by a network side are received through broadcast information.

The uplink bandwidth part set includes at least two uplink bandwidth parts, the at least two uplink bandwidth parts are a part of all uplink bandwidth parts that can be allocated by a network device, and the at least two uplink bandwidth parts include at least one first uplink bandwidth part including PRACH resource configuration information.

The downlink bandwidth part set includes at least two downlink bandwidth parts, and the at least two downlink bandwidth parts are a part of all downlink bandwidth parts that can be allocated by the network device.

It is to be understood that the above operation that the uplink bandwidth part set and the downlink bandwidth part set are configured for the UE refers to that the network device configures the uplink bandwidth part set and the downlink bandwidth part set for all or at least a part of UEs managed by the network device, and the number of the UEs configured with the uplink bandwidth part set and the downlink bandwidth part set is not limited.

That is, the network side (the network device) broadcasts a group of common DL BWP set and UL BWP set in a system broadcast message, and each of the DL BWPs and the UL BWPs corresponds to a configured index value.

Moreover, the at least two UL BWPs included in the UL BWP set includes at least one first uplink bandwidth part including PRACH resource configuration information.

It is to be pointed out that, in the embodiment, the number of uplink bandwidth parts in the configured uplink bandwidth part set may be larger than 1 and smaller than the number of all uplink bandwidth parts divided by a present system. For example, if the present system may divide into four uplink bandwidth parts, the uplink bandwidth part set includes two or three common uplink bandwidth parts. In addition, the downlink bandwidth part set is the same as the above description for the uplink bandwidth part set and will not be elaborated herein.

Figure 6:
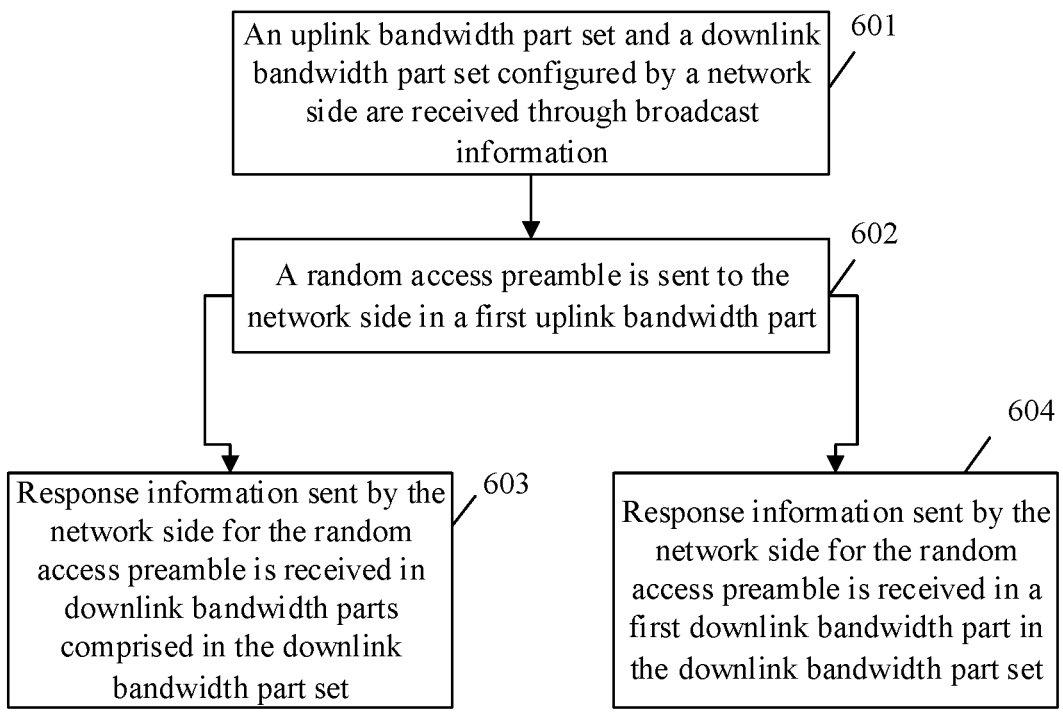
FIG. 6 is a third flowchart of a method for controlling carrier load.
Figure 7:
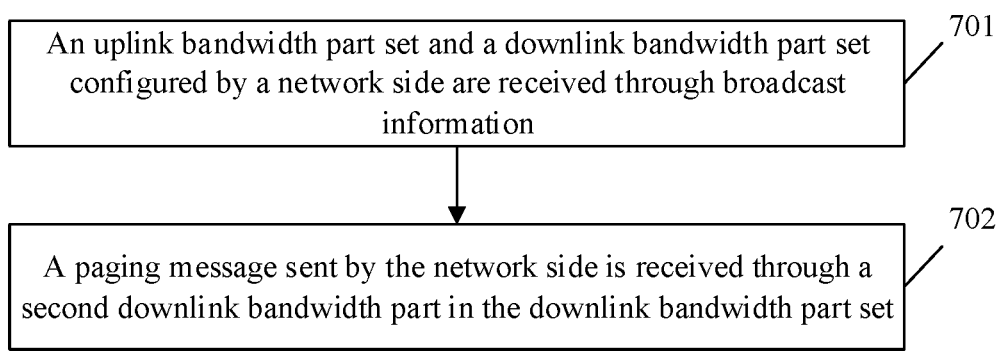
FIG. 7 is a fourth flowchart of a method for controlling carrier load.

Furthermore, the embodiment will be elaborated in two processing scenarios in combination with FIG. 6 and FIG. 7 respectively.

In a first scenario, as shown in FIG. 6, operations 601 to 604 are included.

In operation 601, an uplink bandwidth part set and a downlink bandwidth part set configured by a network side are received through broadcast information.

In operation 602, a random access preamble is sent to the network side in a first uplink bandwidth part.

In operation 603, response information sent by the network side for the random access preamble is received in the downlink bandwidth parts included in the downlink bandwidth part set.

Alternatively, there may be another processing manner.

That is, after operations 601 and 602 are completed, operation 604 is executed, in which, response information sent by the network side for the random access preamble is received in a first downlink bandwidth part in the downlink bandwidth part set.

That is, for a random access process, the UE sends MSG1 in a UL BWP including a PRACH resource in common UL BWPs.

In a first manner, a network side sends an RAR in all BWPs in the common DL BWP set, and the UE is only required to monitor the RAR in one DL BWP in the common DL BWP set.

In a second manner, the network side sends the RAR in one BWP in the common DL BWP set, and the UE also monitors the RAR in the DL BWP.

In the second manner, an operation that a DL BWP where MSG2 is monitored is determined may include that an index value of the first downlink bandwidth part is calculated based on an index of the random access preamble and the number of downlink bandwidth parts included in the downlink bandwidth part set.

The calculation method may include executing a modulo operation by use of the index of the random access preamble and the number of the downlink bandwidth parts included in the downlink bandwidth part set to obtain an operation result as the index value of the DL BWP.

For example, the index of the DL BWP=an index of sending the preamble mod (the number of the BWPs in the DL BWP set).

Second Scenario

As shown in FIG. 7, operations 701 and 702 are included.

In operation 701, an uplink bandwidth part set and a downlink bandwidth part set configured by a network side are received through broadcast information.

In operation 702, a paging message sent by the network side is received through a second downlink bandwidth part in the downlink bandwidth part set.

A manner for calculating an index value of the second downlink bandwidth part in operation 702 may include the following operation.

The index value corresponding to the second downlink bandwidth part for sending the paging message to the UE is calculated based on identification information of the UE and the number of downlink bandwidth parts included in the downlink bandwidth part set.

Specifically, a modulo operation is executed by use of an Identifier of the UE and the number of the downlink bandwidth parts included in the downlink bandwidth part set, to obtain a calculation result as the index value corresponding to the second downlink bandwidth part for sending the paging message to the UE.

For example, for reception of the paging message by the UE, the UE monitors the paging message in a BWP in the common DL BWP set, and the DL BWP is determined by a UE-ID calculated by a paging opportunity mod the number of the BWPs in the DL BWP set. That is, an index of the DL BWP for monitoring the paging message=UE-ID mod (the number of the BWPs in the DL BWP set).

It can be seen that, with the abovementioned manner, the network side configures a part of uplink bandwidth parts and downlink bandwidth parts for the UE, and the part of uplink bandwidth parts and downlink bandwidth parts, as common resources, are configured to perform processing such as paging and random access. Therefore, the problem of relatively high conflict probability caused by performing processing of paging and random access in only one uplink bandwidth part and only one downlink bandwidth part can be solved, and the problem of network-side resource waste caused by sending of a downlink random access response in all BWPs can also be solved.

Third Embodiment

Figure 8:
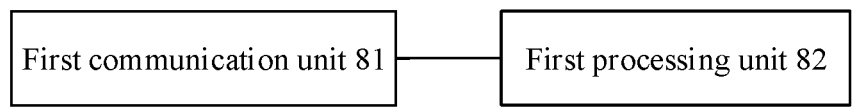
FIG. 8 is a composition structure diagram of a network device according to an embodiment of the disclosure.

The embodiment of the disclosure provides a network device, which, as shown in FIG. 8, includes a first communication unit 81.

The first communication unit 81 configures an uplink bandwidth part set and a downlink bandwidth part set for a UE through broadcast information.

The uplink bandwidth part set includes at least two uplink bandwidth parts, the at least two uplink bandwidth parts are a part of all uplink bandwidth parts that can be allocated by a network device, and the at least two uplink bandwidth parts include at least one first uplink bandwidth part including PRACH resource configuration information.

The downlink bandwidth part set includes at least two downlink bandwidth parts, and the at least two downlink bandwidth parts are a part of all downlink bandwidth parts that can be allocated by the network device.

It is to be understood that the above operation that the uplink bandwidth part set and the downlink bandwidth part set are configured for the UE refers to that the network device configures the uplink bandwidth part set and the downlink bandwidth part set for all or at least a part of UEs managed by the network device, and the number of the UEs configured with the uplink bandwidth part set and the downlink bandwidth part set is not limited.

That is, a network side (the network device) broadcasts a group of common DL BWP set and UL BWP set in a system broadcast message, and each of the DL BWPs and the UL BWPs corresponds to a configured index value.

Moreover, the at least two UL BWPs included in the UL BWP set includes at least one first uplink bandwidth part including PRACH resource configuration information.

It is to be pointed out that, in the embodiment, the number of uplink bandwidth parts in the configured uplink bandwidth part set may be larger than 1 and smaller than the number of all uplink bandwidth parts divided by a present system. For example, if the present system may divide into four uplink bandwidth parts, the uplink bandwidth part set includes two or three common uplink bandwidth parts. In addition, the downlink bandwidth part set is the same as the above description for the uplink bandwidth part set and will not be elaborated herein Furthermore, the embodiment will be elaborated in two processing scenarios in combination with FIG. 4 and FIG. 5 respectively.

In a first scenario, the first communication unit 81 configures an uplink bandwidth part set and a downlink bandwidth part set for a UE through broadcast information, receives a random access preamble sent by the UE in a first uplink bandwidth part and sends response information for the random access preamble in a downlink bandwidth part included in the downlink bandwidth part set.

Alternatively, there may be another processing manner. The first communication unit 81 sends the response information for the random access preamble to the UE in a first downlink bandwidth part in the downlink bandwidth part set.

That is, for a random access process, the UE sends MSG1 in a UL BWP including a PRACH resource in common UL BWPs.

In a first manner, a network side sends an RAR in all BWPs in the common DL BWP set, and the UE is only required to monitor the RAR in one DL BWP in the common DL BWP set.

In a second manner, the network side sends the RAR in one BWP in the common DL BWP set, and the UE also monitors the RAR in the DL BWP.

In the second manner, regarding determination of a DL BWP where MSG2 is monitored, the first processing unit 82 is configured to calculate an index value of the first downlink bandwidth part based on an index of the random access preamble and the number of downlink bandwidth parts included in the downlink bandwidth part set.

The calculation method may include executing a modulo operation by use of the index of the random access preamble and the number of the downlink bandwidth parts in the downlink bandwidth part set to obtain an operation result as the index value of the DL BWP.

For example, the index of the DL BWP=an index of sending the preamble mod (the number of the BWPs in the DL BWP set).

Second Scenario

The first communication unit 81 configures an uplink bandwidth part set and a downlink bandwidth part set for a UE through broadcast information and sends a paging message to the UE through a second downlink bandwidth part in the downlink bandwidth part set.

A manner for calculating an index value of the second downlink bandwidth part may include the following operation.

The first processing unit 82 calculates the index value corresponding to the second downlink bandwidth part for sending the paging message to the UE based on identification information of the UE and the number of downlink bandwidth parts included in the downlink bandwidth part set.

Specifically, a modulo operation is executed by use of an Identifier of the UE and the number of the downlink bandwidth parts included in the downlink bandwidth part set, to obtain a calculation result as the index value corresponding to the second downlink bandwidth part for sending the paging message to the UE.

For example, regarding receiving the paging message by the UE, the UE monitors the paging message in a BWP in the common DL BWP set, and the DL BWP is determined by a UE-ID calculated by a paging opportunity mod the number of the BWPs in the DL BWP set. That is, an index of the DL BWP for monitoring the paging message=UE-ID mod (the number of the BWPs in the DL BWP set).

It can be seen that, with the abovementioned manner, the network side configures a part of uplink bandwidth parts and downlink bandwidth parts for the UE, and the part of uplink bandwidth parts and downlink bandwidth parts, as common resources, are configured to perform processing such as paging and random access. Therefore, the problem of relatively high conflict probability caused by performing processing of paging and random access in only one uplink bandwidth part and only one downlink bandwidth part can be solved, and the problem of network-side resource waste caused by sending of a downlink random access response in all BWPs can also be solved.

Fourth Embodiment

Figure 9:
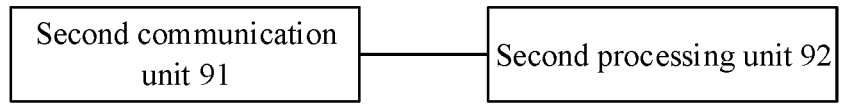
FIG. 9 is a composition structure diagram of a UE according to an embodiment of the disclosure.

The embodiment of the disclosure provides a UE, which, as shown in FIG. 9, includes a second communication unit 91.

The second communication unit 91 receives an uplink bandwidth part set and a downlink bandwidth part set configured by a network side through broadcast information.

The uplink bandwidth part set includes at least two uplink bandwidth parts, the at least two uplink bandwidth parts are a part of all uplink bandwidth parts that can be allocated by a network device, and the at least two uplink bandwidth parts include at least one first uplink bandwidth part including PRACH resource configuration information.

The downlink bandwidth part set includes at least two downlink bandwidth parts, and the at least two downlink bandwidth parts are a part of all downlink bandwidth parts that can be allocated by the network device.

It is to be understood that the above operation that the uplink bandwidth part set and the downlink bandwidth part set are configured for the UE refers to that the network device configures the uplink bandwidth part set and the downlink bandwidth part set for all or at least a part of UEs managed by the network device, and the number of the UEs configured with the uplink bandwidth part set and the downlink bandwidth part set is not limited.

That is, a network side (the network device) broadcasts a group of common DL BWP set and UL BWP set in a system broadcast message, and each of the DL BWPs and the UL BWPs corresponds to a configured index value.

Moreover, the at least two UL BWPs included in the UL BWP set includes at least one first uplink bandwidth part including PRACH resource configuration information It is to be pointed out that, in the embodiment, the number of uplink bandwidth parts in the configured uplink bandwidth part set may be larger than 1 and smaller than the number of all uplink bandwidth parts divided by a present system. For example, if the present system may divide into four uplink bandwidth parts, the uplink bandwidth part set includes two or three common uplink bandwidth parts. In addition, the downlink bandwidth part set is the same as the above description for the uplink bandwidth part set and will not be elaborated herein.

Furthermore, the embodiment will be elaborated in two processing scenarios in combination with FIG. 6 and FIG. 7 respectively.

First Scenario

The second communication unit 91 receives an uplink bandwidth part set and a downlink bandwidth part set configured by a network side through broadcast information, sends a random access preamble to the network side in a first uplink bandwidth part and receives response information for the random access preamble from the network side in a downlink bandwidth part included in the downlink bandwidth part set.

Alternatively, there may be another processing manner. The second communication unit 91 receives the response information for the random access preamble from the network side in a first downlink bandwidth part in the downlink bandwidth part set.

That is, for a random access process, the UE sends MSG1 in a UL BWP including a PRACH resource in common UL BWPs.

In a first manner, a network side sends an RAR in all BWPs in the common DL BWP set, and the UE is only required to monitor the RAR in one DL BWP in the common DL BWP set.

In a second manner, the network side sends the RAR in one BWP in the common DL BWP set, and the UE also monitors the RAR in the DL BWP.

In the second manner, regarding determining the DL BWP where MSG2 is monitored, the UE further includes a second processing unit 92.

The second processing unit 92 calculates an index value of the first downlink bandwidth part based on an index of the random access preamble and the number of downlink bandwidth parts included in the downlink bandwidth part set.

The calculation method may include executing a modulo operation by use of the index of the random access preamble and the number of the downlink bandwidth parts included in the downlink bandwidth part set to obtain an operation result as the index value of the DL BWP.

For example, the index of the DL BWP=an index of sending the preamble mod (the number of the BWPs in the DL BWP set).

Second Scenario

The second communication unit 91 receives an uplink bandwidth part set and a downlink bandwidth part set configured by a network side through broadcast information, and receive a paging message sent by the network side through a second downlink bandwidth part in the downlink bandwidth part set.

A manner for calculating an index value of the second downlink bandwidth part may include the following operation.

The second processing unit 92 calculates the index value corresponding to the second downlink bandwidth part for sending the paging message to the UE based on identification information of the UE and the number of downlink bandwidth parts included in the downlink bandwidth part set.

Specifically, a modulo operation is executed by use of an Identifier of the UE and the number of the downlink bandwidth parts included in the downlink bandwidth part set, to obtain a calculation result as the index value corresponding to the second downlink bandwidth part for sending the paging message to the UE.

For example, regarding receiving the paging message by the UE, the UE monitors the paging message in a BWP in the common DL BWP set, and the DL BWP is determined by a UE-ID calculated by a paging opportunity mod the number of the BWPs in the DL BWP set. That is, an index of the DL BWP for monitoring the paging message=UE-ID mod (the number of the BWPs in the DL BWP set).

It can be seen that, with the abovementioned manner, the network side configures a part of uplink bandwidth parts and downlink bandwidth parts for the UE, and the part of uplink bandwidth parts and downlink bandwidth parts, as common resources, are configured to perform processing such as paging and random access. Therefore, the problem of relatively high conflict probability caused by performing the processing of paging and random access in only one uplink bandwidth part and only one downlink bandwidth part can be solved, and the problem of network-side resource waste caused by sending of a downlink random access response in all BWPs can also be solved.

Figure 10:
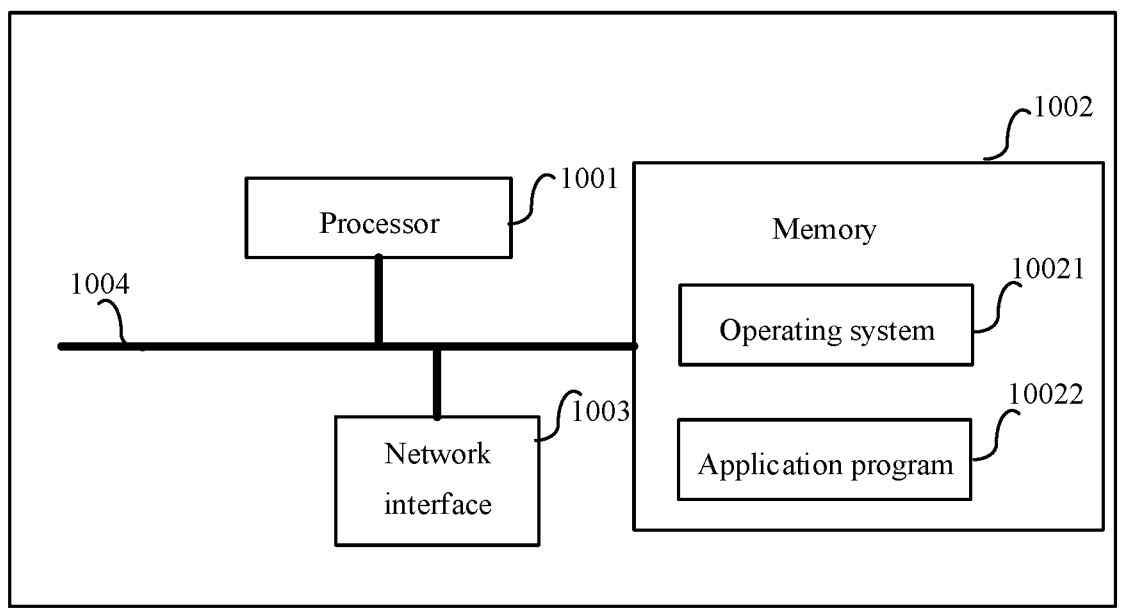
FIG. 10 is a schematic diagram of a hardware architecture according to an embodiment of the disclosure.

An embodiment of the disclosure also provides a hardware composition architecture of a UE or a network device, which, as shown in FIG. 10, includes at least one processor 1001, a memory 1002 and at least one network interface 1003. All the components are coupled together through a bus system 1004. It can be understood that the bus system 1004 is configured to implement connection communication between these components. The bus system 1004 includes a data bus, and further includes a power bus, a control bus and a state signal bus. However, for clear description, various buses in FIG. 10 are denoted as the bus system 1004.

It can be understood that the memory 1002 in the embodiment of the disclosure may be a volatile memory or a nonvolatile memory, or may include both the volatile and nonvolatile memories.

In some implementation modes, the memory 1002 stores the following elements, executable modules or data structures, or a subset thereof or an extended set thereof: an operating system 10021 and an application program 10022.

Herein, the processor 1001 is configured to process the operations of the method in the above first and second embodiments, which will not be elaborated herein.

An embodiment of the disclosure provides a computer storage medium, which stores a computer-executable instruction, the computer-executable instruction being executed to implement the operations of the method in the above first and second embodiments.

When being implemented in form of software functional module and sold or used as an independent product, the above device of the embodiments of the disclosure may also be stored in a computer-readable storage medium. Based on such an understanding, the essential part of the technical solutions of the embodiments of the disclosure or parts of the technical solutions of the embodiments making contributions to the conventional art may be embodied in form of software product, and the computer software product is stored in a storage medium, including a plurality of instructions configured to enable a computer device (which may be a personal computer, a server, a network device or the like) to execute all or a part of the method in each embodiment of the disclosure. The above storage medium includes: various media capable of storing program codes such as a U disk, a mobile hard disk, a Read Only Memory (ROM), a magnetic disk or an optical disk. Therefore, the embodiments of the disclosure are not limited to any specific hardware and software combination.

Correspondingly, the embodiments of the disclosure also provide a computer storage medium, in which a computer program is stored, the computer program being configured to execute the method for controlling carrier load of the embodiments of the disclosure.

Although the preferred embodiments of the disclosure have been disclosed for the exemplary purposes, those skilled in the art may realize that it is also possible to make various improvements, additions and replacements. Therefore, the scope of the disclosure should not be limited to the abovementioned embodiments.

The invention claimed is:

1. A method for controlling carrier load, applied to a user equipment (UE) and comprising:
   receiving, through broadcast information, an uplink bandwidth part set and a downlink bandwidth part set configured by a network side,
   wherein the uplink bandwidth part set comprises at least two uplink bandwidth parts, the at least two uplink bandwidth parts are a part of all uplink bandwidth parts that are allocable by a network device, and the at least two uplink bandwidth parts comprise at least one first uplink bandwidth part comprising physical random access channel (PRACH) resource configuration information; and
   the downlink bandwidth part set comprises at least two downlink bandwidth parts, and the at least two downlink bandwidth parts are a part of all downlink bandwidth parts that are allocable by the network device,
   wherein the method further comprises: after receiving, through the broadcast information, the uplink bandwidth part set and the downlink bandwidth part set configured by the network side:
   sending, in the first uplink bandwidth part, a random access preamble to the network side;
   and receiving, in a first downlink bandwidth part in the downlink bandwidth part set, response information sent by the network side for the random access preamble, wherein the method comprises: calculating, based on an index of the random access preamble and a number of the downlink bandwidth parts comprised in the downlink bandwidth part set, an index value of the first downlink bandwidth part; or
   receiving, through a second downlink bandwidth part in the downlink bandwidth part set, a paging message sent by the network side, wherein the method further comprises calculating, based on identification information of the UE and a number of the downlink bandwidth parts comprised in the downlink bandwidth part set, an index value corresponding to the second downlink bandwidth part for sending the paging message.

2. A network device, comprising a processor, a network interface, and a memory configured to store a computer program capable of running in the processor, wherein the processor is configured to run the computer program to execute an operation of:
   configuring an uplink bandwidth part set and a downlink bandwidth part set for a user equipment (UE) through broadcast information,
   wherein the uplink bandwidth part set comprises at least two uplink bandwidth parts, the at least two uplink bandwidth parts are a part of all uplink bandwidth parts that are allocable by the network device, and the at least two uplink bandwidth parts comprise at least one first uplink bandwidth part comprising physical random access channel (PRACH) resource configuration information; and
   the downlink bandwidth part set comprises at least two downlink bandwidth parts, and the at least two downlink bandwidth parts are a part of all downlink bandwidth parts that are allocable by the network device,
   wherein the network interface is configured to receive, in the first uplink bandwidth part, a random access preamble sent by the UE, and send, in a first downlink bandwidth part in the downlink bandwidth part set, response information for the random access preamble to the UE, and the processor is configured to run the computer program to execute an operation of: calculating an index value of the first downlink bandwidth part based on an index of the random access preamble and a number of the downlink bandwidth parts comprised in the downlink bandwidth part set; or
   wherein the network interface is configured to send a paging message to the UE through a second downlink bandwidth part in the downlink bandwidth part set, and the processor is configured to run the computer program to execute an operation of: calculating an index value corresponding to the second downlink bandwidth part for sending the paging message to the UE based on identification information of the UE and a number of the downlink bandwidth parts comprised in the downlink bandwidth part set.

3. A user equipment (UE), comprising a processor, a network interface and a memory configured to store a computer program capable of running in the processor, wherein the network interface is configured to:
   receive, through broadcast information, an uplink bandwidth part set and a downlink bandwidth part set configured by a network side,
   wherein the uplink bandwidth part set comprises at least two uplink bandwidth parts, the at least two uplink bandwidth parts are a part of all uplink bandwidth parts that are allocable by a network device, and the at least two uplink bandwidth parts comprise at least one first uplink bandwidth part comprising physical random access channel (PRACH) resource configuration information; and the downlink bandwidth part set comprises at least two downlink bandwidth parts, and the at least two downlink bandwidth parts are a part of all downlink bandwidth parts that are allocable by the network device, wherein the network interface is configured to send, in the first uplink bandwidth part, a random access preamble to the network side, and receive, in a first downlink bandwidth part in the downlink bandwidth part set, response information for the random access preamble sent by the network side, and wherein the processor is configured to run the computer program to execute an operation of: calculating an index value of the first downlink bandwidth part based on an index of the random access preamble and a number of the downlink bandwidth parts comprised in the downlink bandwidth part set; or wherein the network interface is configured to receive, through a second downlink bandwidth part in the downlink bandwidth part set, a paging message sent by the network side, and wherein the processor is configured to run the computer program to execute an operation of: calculating, based on identification information of the UE and a number of the downlink bandwidth parts comprised in the downlink bandwidth part set, an index value corresponding to the second downlink bandwidth part for sending the paging message.

* * * * *